[11] 3,601,477

| [72] | Inventor | Masayuki Miyazaki |
| --- | --- | --- |
|  |  | Fujisawa-shi, Japan |
| [21] | Appl. No. | 775,643 |
| [22] | Filed | Nov. 14, 1968 |
| [45] | Patented | Aug. 24, 1971 |
| [73] | Assignee | Canon Kabushiki Kaisha |
|  |  | Tokyo, Japan |
| [32] | Priority | Nov. 22, 1967 |
| [33] |  | Japan |
| [31] |  | 42/74668 |

[54] PENTAPRISM FOR SINGLE LENS REFLEX CAMERA
3 Claims, 4 Drawing Figs.

| [52] | U.S. Cl. | 350/286, 95/42 |
| --- | --- | --- |
| [51] | Int. Cl. | G02b 5/04 |
| [50] | Field of Search | 350/286, 287, 301, 48–53; 88/1.5; 95/42, 44 |

[56] References Cited
UNITED STATES PATENTS

| 880,028 | 2/1908 | Konig | 350/49 |
| --- | --- | --- | --- |
| 3,327,600 | 6/1967 | Trankner | 95/42 |

FOREIGN PATENTS

| 1,046,771 | 7/1951 | France | 95/42 |
| --- | --- | --- | --- |

*Primary Examiner*—John K. Corbin
*Assistant Examiner*—Michael J. Tokar
*Attorney*—Ward, McElhannon, Brooke & Fitzpatrick ABSTRACT: This invention relates to a pentaprism incorporated in single lens reflex cameras which is so constructed that the final surface, in other words the transparent surface on the eyepiece side, of the prism is slanted to make a specified angle with the optical axis of the finder in order to eliminate the disturbing reflection of light within the finger.

*INVENTOR.*
MASAYUKI MIYAZAKI

*BY* MARN & JANGARATHIS
Attorneys

PENTAPRISM FOR SINGLE LENS REFLEX CAMERA

This invention relates to a pentaprism for single lens reflex cameras.

Figure 2A:
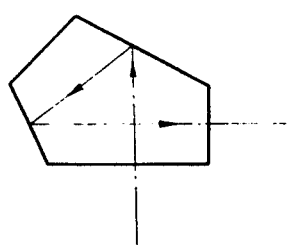
Figure 2B:
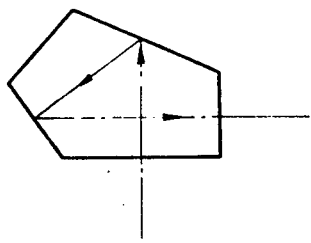
Figure 2C:
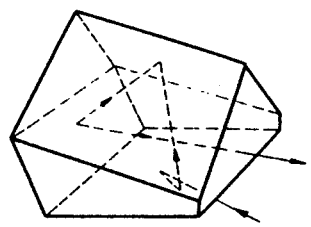

In the conventional single lens reflex camera using a pentaprism, false images produced outside the field of vision of the finder by the total reflection of light at the transparent surfaces at the bottom and the eyepiece sides of the prism tremendously disturb the view form the finder, as seen from FIGS. 2A, 2B, and 2C which show the light paths of such disturbing lights. The conventional means for removing these disturbing lights are as follows:

The height of the prism is increased or a mask is placed on both reflecting surface against the totally reflected light from the bottom surface of the prism; or grooves are cut into the transparent surface of the eyepiece side of the prism to avoid the reflection of disturbing light. However, these means also provide various disadvantages such as, disturbing the compactization of the camera; reducing forcively the magnification factor of the finder; increasing the number of processings.

An object of the present invention is to solve such inconveniences and a main object of the present invention is to obtain a clear finder view by preventing the finder from the invasion of disturbing light, using a pentaprism of comparatively simple structure.

Another object of the present invention is to increase the economical effect by providing comparatively small sized pentaprism which solves these problems and serves to the compactization of the camera without increasing the number of processes required for assembly and processing, and without reducing the magnification factor of the finder.

Figure 1:
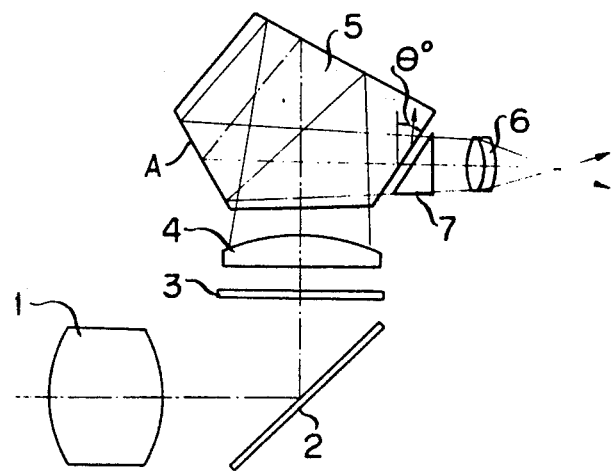

The present invention will be more apparent from the following description referring to an embodiment shown in the drawings in which;

FIG. 1 shows a side view of the principal portion of a single lens reflex camera equipped with a pentaprism embodying the present invention; and FIGS. 2A, 2B and 2C show the examples and light paths of disturbing light rays of single lens reflex camera of a conventional pentaprism.

In FIG. 1, 1 is an objective lens of the camera, 2 is a reflection mirror, 3 is a focusing plate, 4 is a condenser lens, 5 is a pentaprism, and 6 is an ocular lens. According to the present invention, the angle $\theta$ formed between the final surface, in other words the transparent surface on the eyepiece side, of the pentaprism 5 and the optical axis passing through the surface is given by $$\sin^{-1}\frac{1}{N} \geq \theta° \geq \sin^{-1}\frac{1}{N} - 20°$$

wherein $N$ is a refractive index of the pentaprism.

In order to compensate the light path difference caused by the considerably large slanting of the surface against the optical axis, a triangular light path compensating prism is placed near the surface.

The reason why the value of $\theta$ is limited as above is that, in reflex cameras, the slanting angle of normal beam of light needed for building an image is usually less than 20° and when the value of $\theta$ is within the above-mentioned limits, all the disturbing beams of light shown in each example of FIG. 2 form greater angles with the optical axis than the normal image-building beam of light does, and are totally reflected by the transparent surface on the eyepiece side of the pentaprism. Thus no disturbing lights will reach the eye and, furthermore, the normal image building beams of light will not be interrupted.

The pentaprism according to the present invention can be made simpler in structure and more compact in total size than the conventional prism provided with false image prevention measures and can be effective in making a single lens reflex camera easier.

I claim:

1. In a single lens reflex camera having in the direction of an object beam an objective lens, a reflex mirror and an ocular lens, the improvement which comprises a pentaprism positioned between said reflex mirror and said ocular lens and having a surface from which the object beam passes to said ocular lens, which surface forms an angle $\theta$ with the optical axis therethrough, where $\theta$ is within the following range:

$$\sin^{-1}\frac{1}{N} \geq \theta° \geq \sin^{-1}\frac{1}{N} - 20°$$

wherein $N$ is the index of refraction of the pentaprism to totally reflect a stray light beam; and an optical path compensating prism positioned between said pentaprism and said ocular lens to compensate the light path difference caused by the considerably large slanting of said pentaprism surface with respect to the optical axis of said ocular lens, wherein an air gap is provided between said pentaprism and said compensating prism to totally reflect a stray light beam.

2. The lens system as defined in claim 1 wherein the optical path compensating prism is triangularly shaped and has a surface adjacent the pentaprism receiving the object beam therefrom, which surface forms an angle $\theta$ relative to the optical axis therethrough, and a surface adjacent said ocular lens which form a 90° angle with the optical axis therethrough.

3. The lens system as defined in claim 1 wherein an air gap is provided between said pentaprism and said compensating prism.